United States Patent
Newstadt et al.

(10) Patent No.: US 9,256,766 B1
(45) Date of Patent: Feb. 9, 2016

(54) SYSTEMS AND METHODS FOR COLLECTING THIEF-IDENTIFYING INFORMATION ON STOLEN COMPUTING DEVICES

(71) Applicant: Symantec Corporation, Mountain View, CA (US)

(72) Inventors: Keith Newstadt, West Newton, MA (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 234 days.

(21) Appl. No.: 14/012,433

(22) Filed: Aug. 28, 2013

(51) Int. Cl.
  *G06F 11/00* (2006.01)
  *G06F 21/88* (2013.01)

(52) U.S. Cl.
  CPC ..................... *G06F 21/88* (2013.01)

(58) Field of Classification Search
  USPC .................................... 726/25, 34
  See application file for complete search history.

(56) References Cited

U.S. PATENT DOCUMENTS

| | | | |
|---|---|---|---|
| 6,658,586 B1 * | 12/2003 | Levi ........................ | B60R 25/04 714/4.3 |
| 8,423,511 B1 | 4/2013 | Bhatia | |
| 2003/0145090 A1 * | 7/2003 | Ostergaard ........ | H04L 29/12009 709/229 |
| 2004/0153863 A1 * | 8/2004 | Klotz ..................... | H04L 41/12 714/45 |
| 2006/0050688 A1 * | 3/2006 | Panagopoulos ........ | H04L 12/66 370/356 |
| 2007/0250839 A1 * | 10/2007 | Van Der Sanden ... | G06F 9/4443 719/315 |
| 2009/0183266 A1 * | 7/2009 | Tan ........................ | G06F 21/88 726/35 |
| 2010/0134275 A1 * | 6/2010 | Fitzgerald ............... | G06F 21/88 340/539.13 |
| 2011/0161667 A1 * | 6/2011 | Poornachandran ..... | G06F 21/84 713/168 |
| 2013/0086254 A1 * | 4/2013 | Bhola ................... | H04L 63/168 709/224 |
| 2013/0137376 A1 * | 5/2013 | Fitzgerald ............ | H04B 5/0056 455/41.3 |
| 2013/0247202 A1 * | 9/2013 | Yablokov ................ | G06F 21/56 726/24 |
| 2014/0272891 A1 * | 9/2014 | Saladino .................. | G09B 5/02 434/350 |

OTHER PUBLICATIONS

Corrado Leita et al.; Systems and Methods for Performing Internet Site Security Analyses; U.S. Appl. No. 13/177,891, filed Jul. 7, 2011.
Shaun Cooley et al.; Systems and Methods for Verifying User Identities; U.S. Appl. No. 13/326,745, filed Dec. 15, 2011.
Jason Franklin; Systems and Methods for Certifying Client-Side Security for Internet Sites; U.S. Appl. No. 13/543,764; Filed on U.S. Appl. No. 13/543,764.
Joseph Chen et al.; Systems and Methods for Detecting Calls From Illegitimate Calling Parties; U.S. Appl. No. 13/903,953, filed May 28, 2013.
Hong Yong Xiao et al.; Systems and Methods for Locating Lost Devices; U.S. Appl. No. 13/927,616, filed Jun. 26, 2013.

* cited by examiner

*Primary Examiner* — Joseph P Hirl
*Assistant Examiner* — Sayed Beheshti Shirazi
(74) *Attorney, Agent, or Firm* — ALG Intellectual Property, LLC

(57) ABSTRACT

A computer-implemented method for collecting thief-identifying information on stolen computing devices may include (1) receiving an indication that a computing device has been stolen, (2) detecting an attempt by a thief of the stolen computing device to access a user account of the thief via the stolen computing device, (3) collecting, based at least in part on detecting the attempt by the thief of the stolen computing device to access the user account of the thief via the stolen computing device, information capable of identifying the thief, and (4) reporting, to a remote computing device, the information capable of identifying the thief. Various other methods, systems, and computer-readable media are also disclosed.

18 Claims, 6 Drawing Sheets

SYSTEMS AND METHODS FOR COLLECTING THIEF-IDENTIFYING INFORMATION ON STOLEN COMPUTING DEVICES

BACKGROUND

Computing devices have become a ubiquitous part of everyday life. For example, millions of people carry and use mobile computing devices (e.g., smartphones and tablets) throughout their daily activities. Unfortunately, such computing devices (especially relatively small, mobile computing devices) may be easily stolen by thieves. As a result, individuals and organizations have begun to use various anti-theft solutions to attempt to locate and recover their stolen computing devices.

Conventional solutions for locating stolen computing devices typically rely on Global Positioning System (GPS) or similar technologies to determine the geographic location of the stolen computing devices. However, geographic locations may not always enable stolen computing devices to be located. For example, it may be difficult to locate a stolen computing device if the geographic location of the computing device points to an apartment building housing hundreds of people or to a large public location. Moreover, in the event that a stolen computing device is located, a geographic location may not be sufficient to incriminate the person who stole it. Accordingly, the instant disclosure identifies a need for additional and improved systems and methods for locating stolen computing devices and/or identifying thieves.

SUMMARY

As will be described in greater detail below, the instant disclosure generally relates to systems and methods for collecting thief-identifying information on stolen computing devices by collecting information capable of identifying the thieves of the stolen computing devices when the thieves access their user accounts via the stolen computing devices. In one example, a computer-implemented method for collecting thief-identifying information on stolen computing devices may include (1) receiving an indication that a computing device has been stolen, (2) detecting an attempt by a thief of the stolen computing device to access a user account of the thief via the stolen computing device, (3) collecting, based at least in part on detecting the attempt by the thief of the stolen computing device to access the user account of the thief via the stolen computing device, information capable of identifying the thief, and (4) reporting, to a remote computing device, the information capable of identifying the thief. In some examples, the user account may include a user account at a web site.

In some examples, the step of detecting the attempt to access the user account of the thief may include detecting an attempt to log into the user account of the thief via the stolen computing device, and the step of collecting the information capable of identifying the thief may include collecting login information entered by the thief as part of the attempt to log into the user account of the thief. In some examples, the step of detecting the attempt to log into the user account of the thief via the stolen computing device may include determining that the attempt to log into the user account of the thief via the stolen computing device was successful. In at least one example, the login information may include a username of the user account.

In some examples, the step of detecting the attempt to access the user account of the thief may include detecting an attempt to access content associated with the user account of the thief, and the content associated with the user account of the thief may include information capable of identifying the thief. In various examples the information capable of identifying the thief may include a username of the user account and/or profile information of the user account.

In some examples, the step of detecting the attempt to access the user account of the thief may include detecting an attempt to access content associated with the user account of the thief via a uniform resource locator associated with the user account of the thief that may include information capable of identifying the thief.

In some examples, the step of detecting the attempt to access the user account of the thief may include detecting an authentication token that was used to access the user account of the thief, and the step of collecting the information capable of identifying the thief may include using the authentication token to access content associated with the user account of the thief that may include information capable of identifying the thief.

In some examples, the computer-implemented method for collecting thief-identifying information on stolen computing devices may further include determining, based at least in part on the information capable of identifying the thief, the identity of the thief of the stolen computing device and/or locating, based at least in part on the information capable of identifying the thief, the stolen computing device.

In some examples, the steps of detecting and collecting may be performed by a web-browser plugin at the computing device and/or a network filter at the computing device.

In one embodiment, a system for implementing the above-described method may include (1) a receiving module that receives an indication that a computing device has been stolen, (2) a detecting module that detects an attempt by a thief of the stolen computing device to access a user account of the thief via the stolen computing device, (3) a collecting module that collects, based at least in part on detecting the attempt by the thief of the stolen computing device to access the user account of the thief via the stolen computing device, information capable of identifying the thief, (4) a reporting module that reports, to a remote computing device, the information capable of identifying the thief, and (5) at least one processor that executes the receiving module, the detecting module, the collecting module, and the reporting module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive an indication that the computing device has been stolen, (2) detect an attempt by a thief of the stolen computing device to access a user account of the thief via the stolen computing device, (3) collect, based at least in part on detecting the attempt by the thief of the stolen computing device to access the user account of the thief via the stolen computing device, information capable of identifying the thief, and (4) report, to a remote computing device, the information capable of identifying the thief.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
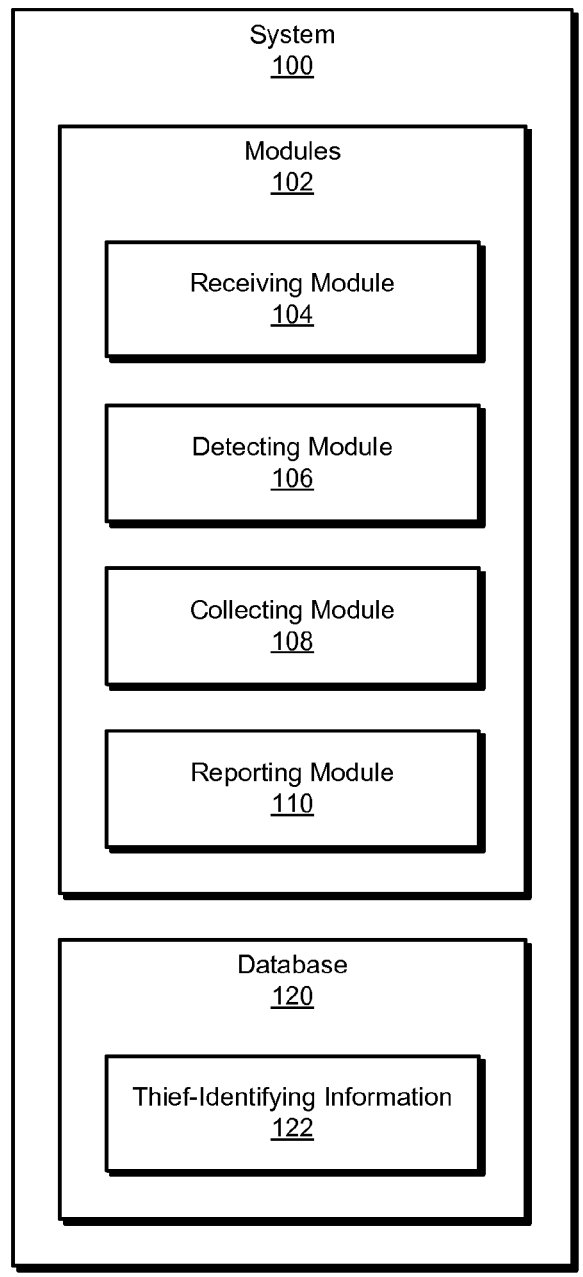
FIG. 1 is a block diagram of an exemplary system for collecting thief-identifying information on stolen computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for collecting thief-identifying information on stolen computing devices. As will be explained in greater detail below, by collecting information capable of identifying a thief of a stolen computing device when the thief accesses a user account of the thief via the stolen computing device, the systems and methods described herein may enable identification of the thief and/or recovery of the stolen computing device. Moreover, by collecting identity information when the thief is logged into a user account, the systems and methods described herein may collect identity information associated with the thief when the thief has been authenticated and/or verified by the system hosting the user account of the thief. Embodiments of the instant disclosure may also provide various other advantages and features, as discussed in greater detail below.

Figure 2:
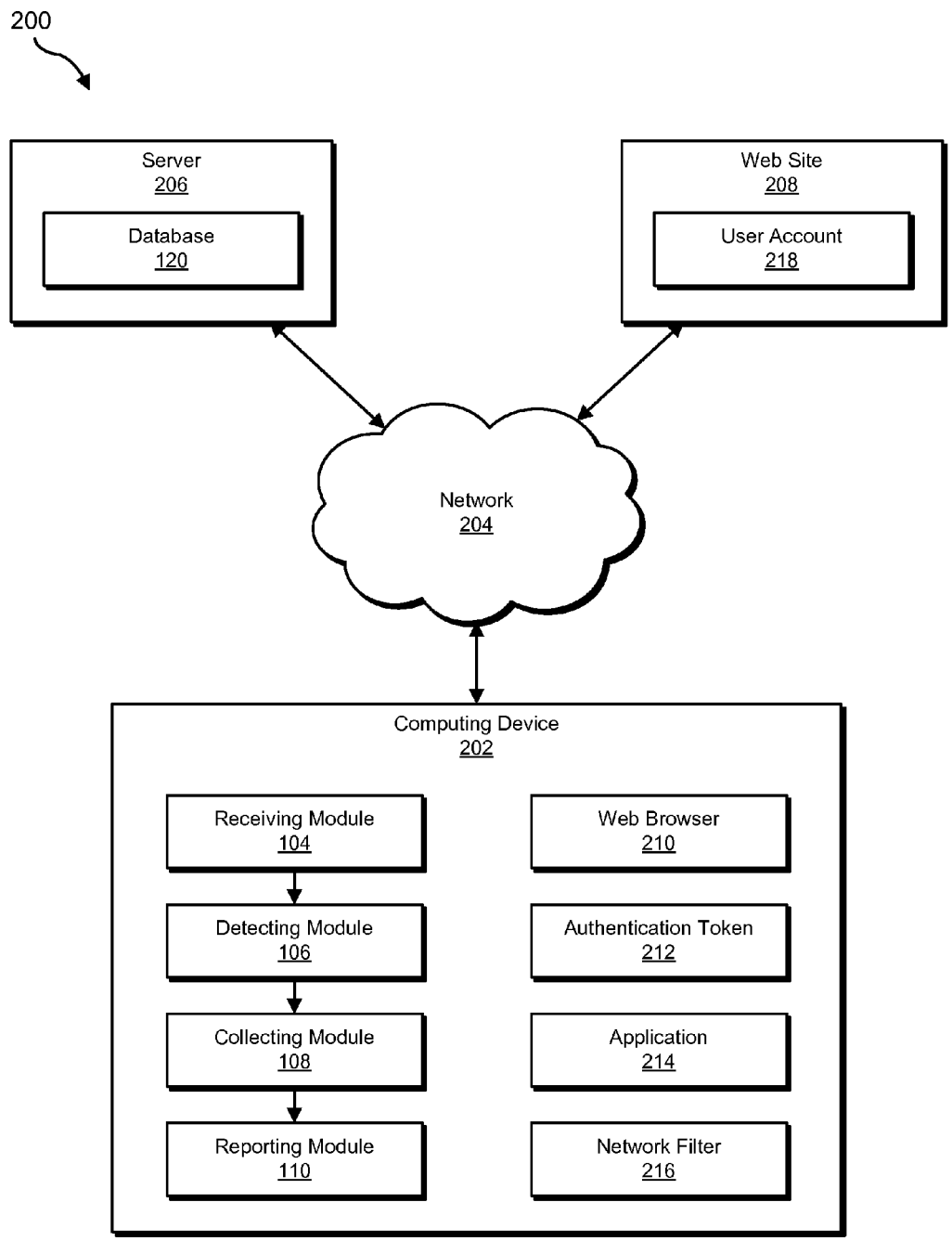
FIG. 2 is a block diagram of an exemplary system for collecting thief-identifying information on stolen computing devices.

The following will provide, with reference to FIGS. 1 and 2, detailed descriptions of exemplary systems for collecting thief-identifying information on stolen computing devices. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for collecting thief-identifying information on stolen computing devices. As illustrated in this figure, exemplary system 100 may include one or more modules 102 for performing one or more tasks. For example, and as will be explained in greater detail below, exemplary system 100 may include a receiving module 104 that receives an indication that a computing device has been stolen. Exemplary system 100 may also include a detecting module 106 that detects an attempt by a thief of the stolen computing device to access a user account of the thief via the stolen computing device.

In addition, and as will be described in greater detail below, exemplary system 100 may include a collecting module 108 that collects information capable of identifying the thief. Exemplary system 100 may also include a reporting module 110 that reports, to a remote computing device, the information capable of identifying the thief. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks. In at least one example, one or more of modules 102 in FIG. 1 may represent all or a portion of an anti-theft agent running on a stolen computing device.

As illustrated in FIG. 1, exemplary system 100 may also include one or more databases, such as database 120. In one example, database 120 may include thief-identifying information 122 for storing information capable of identifying thieves.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202, a server 206, and a web site 208 in communication via a network 204. Computing device 202 may be programmed with one or more of modules 102 and/or may store all or a portion of the data in database 120. Additionally or alternatively, server 206 and/or web site 208 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in collecting thief-identifying information on stolen computing devices. For example, and as will be described in greater detail below, one or more of modules 102 may cause computing device 202 and/or server 206 to (1) receive an indication that computing device 202 has been stolen, (2) detect an attempt by a thief of computing device 202 to access user account 218 of the thief via computing device 202, (3) collect information capable of identifying the thief, and (4) report the information capable of identifying the thief to server 206.

Computing device 202 generally represents any type or form of computing device capable of reading computer-executable instructions and/or collecting thief-identifying information. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of reading computer-executable instructions and/or collecting thief-identifying information. Examples of server 206 include, without limitation, application servers and database servers configured to provide various database services and/or run certain software applications.

Web site 208 generally represents any type or form of server, Internet service, Internet resource, and/or Internet portal with which a user may maintain an account (e.g., user account 218) and/or to which a user may log into to access one or more features, services, and/or resources. Examples of web site 208 include, without limitation, social networking services, financial service institution portals, commerce portals, governmental portals, and the like.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202, server 206, and web site 208.

Figure 3:
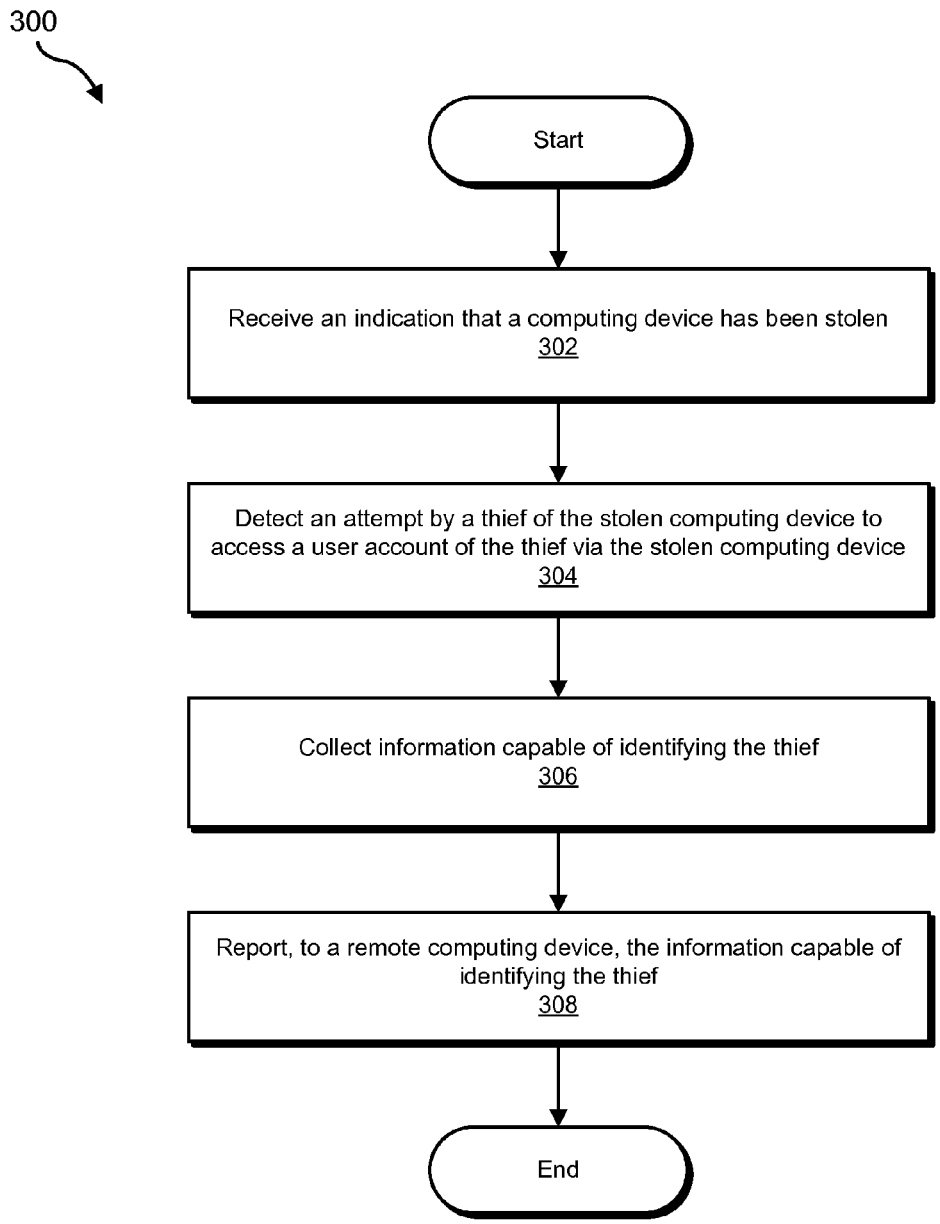
FIG. 3 is a flow diagram of an exemplary method for collecting thief-identifying information on stolen computing devices.

FIG. 3 is a flow diagram of an exemplary computer-implemented method 300 for collecting thief-identifying information on stolen computing devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive an indication that a computing device has been stolen. For example, at step 302 receiving module 104 may, as part of computing device 202 in FIG. 2, receive an indication that computing device 202 has been stolen.

As used herein, the term "stolen computing device" generally refers to any computing device that has been lost or taken by another person without the permission or knowledge of a legitimate user (e.g., an owner) of the computing device. In some examples, the term "stolen computing device" may also include any computing device that a legitimate user of the computing device believes to be stolen. In at least one example, the systems described herein may consider a computing device to be stolen once a legitimate user of the computing device has reported the computing device as stolen.

The systems described herein may perform step 302 in any suitable manner. In some examples, receiving module 104 may receive an indication that a computing device has been stolen as part of receiving a report from a legitimate user of the computing device that indicates that the computing device has been stolen. For example, receiving module 104 may, as part of computing device 202, receive a report directly from a legitimate user of computing device 202 that indicates that computing device 202 has been stolen.

Additionally or alternatively, receiving module 104 may receive a relayed message that indicates that computing device 202 has been stolen. For example, receiving module 104 may, as part of computing device 202, receive a message from server 206 that indicates that a legitimate user of computing device 202 reported computing device 202 as stolen to server 206.

In at least one example upon receiving an indication that a computing device has been stolen, receiving module 104 may enable the collection of thief-identifying information on the stolen computing device. For example upon receiving an indication that computing device 202 has been stolen, receiving module 104 may switch computing device 202 from a normal-operating mode to an identity-capturing mode in which information capable of identifying the thief of computing device 202 may be collected. In some examples, the systems described herein may identify, collect, and/or report information capable of identifying a thief of a computing device only after the computing device has been placed in an identity-capturing mode.

At step 304, one or more of the systems described herein may detect an attempt by a thief of the stolen computing device to access a user account of the thief via the stolen computing device. For example, at step 304 detecting module 106 may, as part of computing device 202 in FIG. 2, detect an attempt by a thief of computing device 202 to access user account 218 of the thief at web site 208 via computing device 202.

As used herein, the term "thief" generally refers to any person that steals a computing device and/or uses a stolen computing device. For example, the term "thief" may refer to any person that uses a computing device after the computing device has been stolen and/or after the computing device has been reported as stolen.

The term "user account," as used herein, generally refers to any identity of a user maintained by a service that enables the service to authenticate the user and/or provide the user with access to the service. Additionally or alternatively, the term "user account" may refer to any portion of a service linked to and/or accessible by an authenticated user. In some examples, a user account may include an account created and/or maintained by a remote site for facilitating access to one or more computing resources and/or services at the remote site. For example, a user account may include an account at a web site (e.g., user account 218 at web site 208).

The systems described herein may perform step 304 in any suitable manner. In some examples, detecting module 106 may detect an attempt by a thief to access a user account of the thief via a stolen computing device by detecting when the thief logs into the user account of the thief via the stolen computing device. In one example, detecting module 106 may detect an attempt by a thief to access a user account at a web site by (1) monitoring the thief's use of a web browser on the stolen computing device and by (2) detecting when the thief logs into the user account via the web browser (e.g., by detecting when the thief enters a username and/or password via the web browser). For example, detecting module 106 may detect an attempt by a thief of computing device 202 to access user account 218 at web site 208 by monitoring the thief's use of web browser 210 and by detecting when the thief logs into user account 218 via web browser 210.

In another example, detecting module 106 may detect an attempt by a thief to access a user account of a remote service by (1) monitoring the thief's use of an application that is installed on the stolen computing device and that provides access to the user account at the remote service and by (2) detecting when the thief logs into the user account via the application. For example, detecting module 106 may detect an attempt by a thief of computing device 202 to access user account 218 at a web site 208 by monitoring the thief's use of application 214 and by detecting when the thief logs into user account 218 via application 214.

In some examples, detecting module 106 may also determine whether a thief's attempt to log into a user account is successful. By ensuring that a thief successfully logs into a user account, detecting module 106 may ensure that the thief has been authenticated and/or validated so that any thief-identifying information collected in association with the user account of the thief accurately identifies the thief.

Figure 4:
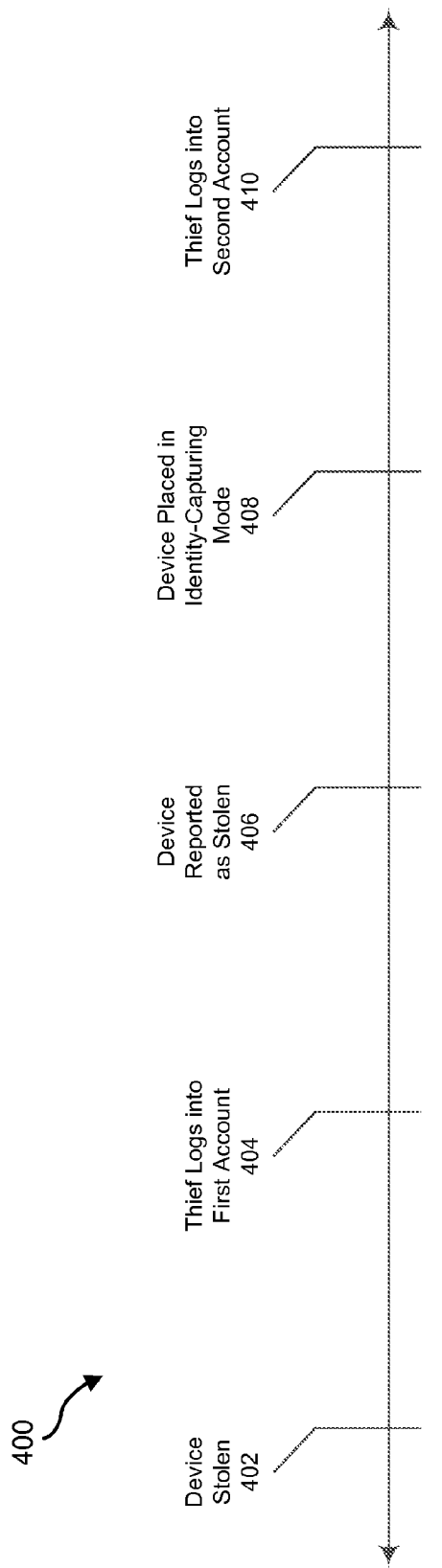
FIG. 4 is a diagram of an exemplary timeline for collecting thief-identifying information on stolen computing devices.

In some examples as mentioned above, detecting module 106 may not begin to monitor attempts to access user accounts via a stolen computing device until after the stolen computing device has been reported as stolen and/or placed in an identity-capturing mode. However as illustrated in FIG. 4, a thief may access user accounts via a stolen computing device before the stolen computing device has been reported as stolen and/or placed in an identity-capturing mode. For example as shown in FIG. 4 at time 402, a thief may steal a computing device. At time 404, the thief may use the stolen computing device to log into and access a first user account of the thief. At time 406, the owner of the computing device may report the device as stolen. At time 408, the systems described herein may place the computing device in an identity-capturing mode, and detecting module 106 may begin monitoring attempts to access user accounts via the stolen computing device. At time 410, the thief may use the stolen computing device to log into and access a second user account of the thief. In this example, detecting module 106 may detect the thief's attempt to log into and access the second user account as the attempt occurs. To detect that the thief logged into and accessed the first user account, detecting module 106 may detect whether a thief has already logged into a user account of the thief via the stolen computing device when the computing device is reported a stolen and/or is placed in identity-capturing mode.

Returning to FIG. 3 in some examples, detecting module 106 may detect an attempt by a thief to access a user account of the thief via a stolen computing device by detecting when a thief has already logged into a user account of the thief via the stolen computing device. In one example, detecting module 106 may detect when a thief has already logged into a user account of the thief by detecting an authentication token that was provided to the thief when the thief logged into the user account and/or that is used to access the user account of the thief. As used herein, the term "authentication token" generally refers to any information that is used by a system to track authenticated users. In one example, an authentication token may include a cookie (e.g., an authentication cookie) that has been sent from a web site to a user's web browser and that is used by the web site to track the user as the user interacts with the web site.

Detecting module 106 may detect attempts by the thief to access the user account of the thief in various contexts. In one example, detecting module 106 may represent a portion of a web browser (e.g., a web-browser plug-in) installed on a computing device that is capable of monitoring a thief's online behavior. Additionally or alternatively, detecting module 106 may represent a portion of a network filter that is capable of monitoring communications received at or sent from a stolen computing device.

At step 306, one or more of the systems described herein may collect information capable of identifying the thief based at least in part on detecting the attempt by the thief of the stolen computing device to access the user account of the thief via the stolen computing device. For example, at step 306 collecting module 108 may, as part of computing device 202 in FIG. 2, collect information capable of identifying the thief of computing device 202 based at least in part on an attempt by the thief to access user account 218 of the thief via computing device 202.

The systems described herein may perform step 306 in any suitable manner. In some examples, collecting module 108 may collect information capable of identifying a thief by identifying and collecting information that may be used to identify, contact, or locate the thief and/or prove that the thief stole a computing device. In one example, collecting module 108 may collect such information by identifying and collecting information provided by a thief via a stolen computing device while the thief accessed a user account of the thief. For example, collecting module 108 may capture a thief's username when the thief logs into a user account. Additional examples of information that may be provided by a thief while accessing a user account and that may be collected by collecting module 108 may include, without limitation, a name, an address (e.g., a shipping or billing address), a telephone number, an email address, and/or a digital photograph (e.g., a portrait).

In some examples, collecting module 108 may identify, extract, and collect information capable of identifying a thief from content accessed by the thief when the thief accessed a user account. For example, collecting module 108 may identify, extract, and collect a name or a username from a webpage (e.g., from a salutation contained within the webpage). Additional examples of information that may be included within content access by a thief and that may be collected by collecting module 108 may include, without limitation, an address (e.g., a shipping or billing address), a telephone number, an email address, and/or a digital photograph (e.g., a portrait).

In some examples, collecting module 108 may collect URLs of content accessed by a thief that may be capable of identifying the thief. For example, collecting module 108 may collect the URLs of the thief's user-profiles.

In some examples, collecting module 108 may maintain a list of URLs of content known to include identity information and may use the list to identify, extract, and collect information capable of identifying a thief. In at least one example, the list of URLs of content known to include identity information may include URLs of content only accessible to a thief if the thief has logged into a user account.

In some examples, collecting module 108 may use an authentication token identified as part of step 304 to access content known to include identity information and may identify, extract, and collect information capable of identifying a thief from the content. By using authentication tokens to access content known to include identity information, collecting module 108 may collect information capable of identifying a thief without needing the thief to access the content.

In addition to or as an alternative to collecting the above mentioned information, collecting module 108 may also collect IP addresses of the stolen computing device, web-site certificates, cookies, and/or any other information that may be used to identify the thief and/or prove that the thief stole the computing device.

Collecting module 108 may collect information capable of identifying thieves in various contexts. In one example, collecting module 108 may represent a portion of a web browser (e.g., a web-browser plug-in) installed on a computing device that is capable of monitoring a thief's online behavior and may collect information enter into and/or received through the web browser. Additionally or alternatively, collecting module 108 may represent a portion of a network filter that is capable of monitoring communications received at or sent from a stolen computing device and may monitor any communications that include information capable of identifying the thief.

At step 308, one or more of the systems described herein may report, to a remote computing device, the information capable of identifying the thief. For example, at step 308 reporting module 110 may, as part of computing device 202 in FIG. 2, report information capable of identifying the thief of computing device 202 to server 206.

The systems described herein may perform step 308 in any suitable manner. In some examples, reporting module 110 may report information capable of identifying a thief to a remote computing device by simply sending any or all of the information collected by collecting module 108 to the remote computing device. For example, reporting module 110 may send any or all of the information collected by collecting module 108 to server 206. In at least one example, reporting module 110 may store the information capable of identifying the thief to thief-identifying information 122 at server 206 and/or may provide the information capable of identifying the thief to a legitimate user of the stolen computing device. Upon completion of step 308, exemplary method 300 in FIG. 3 may terminate.

In some examples, the reporting module 110 may use the information capable of identifying the thief to determine the identity of the thief. For example, reporting module 110 may use the information capable of identifying the thief to create a profile for the thief that may include the thief's name, address, email address, telephone number, and/or portrait and/or any other information about the thief that may be helpful in identifying, locating, and/or contacting the thief. In at least one example, reporting module 110 may store the profile for the thief to thief-identifying information 122 at server 206 and/or may provide the profile to a legitimate user of the stolen computing device.

In some examples, reporting module 110 may use the information capable of identifying the thief to acquire additional information about the thief from a third-party database. For example, reporting module 110 may use a username that was collected while the thief accessed a user account at a web site to query the web site for additional information about the thief.

In some examples, reporting module 110 may also use the information capable of identifying the thief to locate the stolen computing device. In one example, reporting module 110 may simply determine that the stolen computing device may be located at an address of the thief.

As explained above, by collecting information capable of identifying a thief of a stolen computing device when the thief accesses a user account of the thief via the stolen computing device, the systems and methods described herein may enable identification of the thief and/or recovery of the stolen computing device. Moreover, by collecting identity information when the thief is logged into a user account, the systems and methods described herein may collect identity information associated with the thief when the thief has been authenticated and/or verified by the system hosting the user account of the thief. For example, the systems and methods described herein may (1) receive, from the owner of a computing device, a report that the computing device has been stolen, (2) monitor an attempt by the thief of the stolen computing device to log into a user account of the thief via the stolen computing device, (3) collect information capable of identifying the thief (e.g., thief's username), and (4) report the information capable of identifying the thief to a remote computing device such that the owner of the stolen computing device may locate the computing device and/or determine the identity of the thief.

Figure 5:
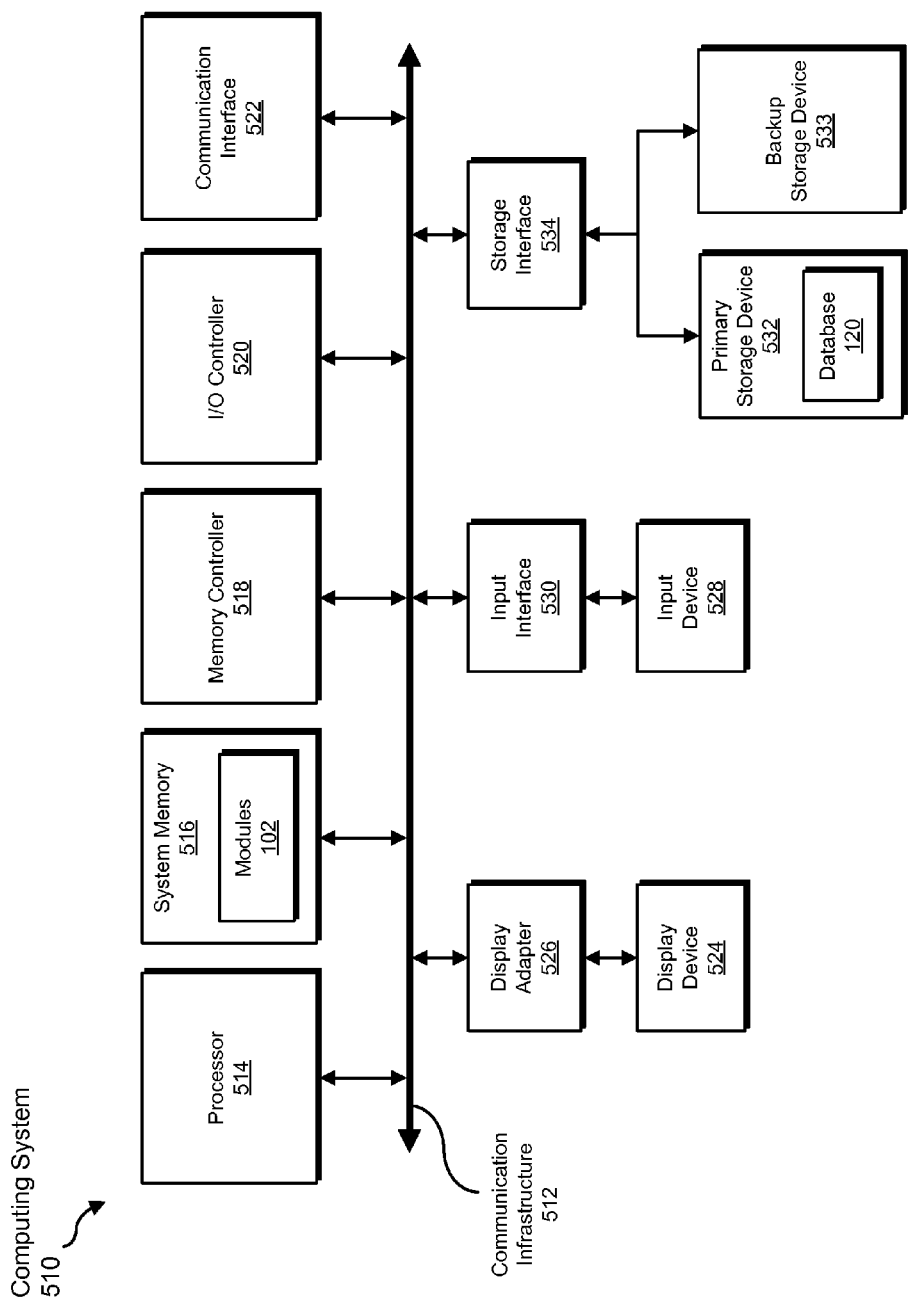
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
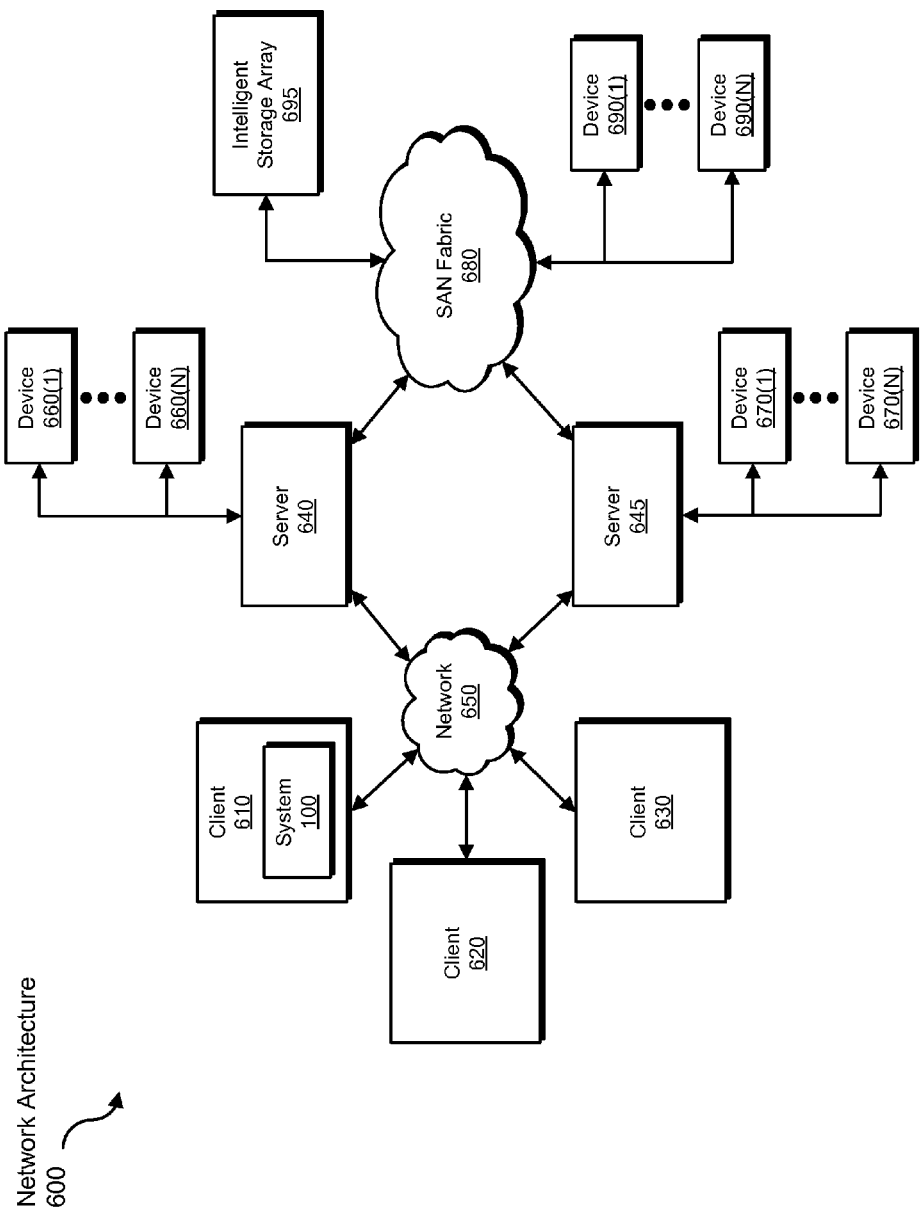
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for collecting thief-identifying information on stolen computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a message to be transformed that indicates that a computing device has been stolen, transform the message and/or information stored at or accessible via the computing device into information capable of identifying the thief of the computing device, output a result of the transformation to a system for determining the identity of the thief and/or locating the stolen computing device, use the result of the transformation to determine the identity of the thief, and store the result of the transformation to a database accessible to an legitimate user of the stolen computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for collecting thief-identifying information on stolen computing devices, at least a portion of the method being performed by a computing device comprising at least one processor, the method comprising:

receiving an indication that the computing device has been stolen;

determining that an attempt by a thief of the stolen computing device to log into a user account of the thief via the stolen computing device was successful;

collecting, at the stolen computing device based at least in part on determining that the attempt was successful, information capable of identifying the thief, wherein the information capable of identifying the thief is accessible at the stolen computing device only when the thief has successfully logged into the user account of the thief via the stolen computing device;

reporting, to a remote computing device, the information capable of identifying the thief.

2. The computer-implemented method of claim 1, wherein:

determining that the attempt to log into the user account of the thief was successful comprises detecting the attempt to log into the user account of the thief via the stolen computing device;

collecting the information capable of identifying the thief comprises collecting login information entered by the thief as part of the attempt to log into the user account of the thief.

3. The computer-implemented method of claim 2, wherein the login information comprises a username of the user account.

4. The computer-implemented method of claim 1, wherein:

determining that the attempt to log into the user account of the thief was successful comprises detecting an attempt to access content associated with the user account of the thief;

the content associated with the user account of the thief comprises the information capable of identifying the thief.

5. The computer-implemented method of claim 4, wherein the information capable of identifying the thief comprises at least one of a username of the user account;

profile information of the user account.

6. The computer-implemented method of claim 1, wherein determining that the attempt to log into the user account of the thief was successful comprises detecting an attempt to access content associated with the user account of the thief via a uniform resource locator associated with the user account of the thief, wherein the uniform resource locator associated with the user account of the thief comprises the information capable of identifying the thief.

7. The computer-implemented method of claim 1, wherein:

determining that the attempt to log into the user account of the thief was successful comprises detecting an authentication token that was used to access the user account of the thief;

collecting the information capable of identifying the thief comprises using the authentication token to access content associated with the user account of the thief, wherein the content associated with the user account of the thief comprises the information capable of identifying the thief.

8. The computer-implemented method of claim 1, further comprising determining, based at least in part on the information capable of identifying the thief, the identity of the thief of the stolen computing device.

9. The computer-implemented method of claim 1, further comprising locating, based at least in part on the information capable of identifying the thief, the stolen computing device.

10. The computer-implemented method of claim 1, wherein the user account comprises a user account at a web site.

11. The computer-implemented method of claim 1, wherein the determining and collecting is performed at least in part by a web-browser plugin at the computing device.

12. The computer-implemented method of claim 1, wherein the determining and collecting is performed at least in part by a network filter at the computing device.

13. A system for collecting thief-identifying information on stolen computing devices, the system comprising:

a receiving module that receives an indication that a computing device has been stolen;

a detecting module that determines that an attempt by a thief of the stolen computing device to log into a user account of the thief via the stolen computing device was successful;

a collecting module that collects, at the stolen computing device based at least in part on the determination that the attempt was successful, information capable of identifying the thief, wherein the information capable of identifying the thief is accessible at the stolen computing device only when the thief has successfully logged into the user account of the thief via the stolen computing device;

a reporting module that reports, to a remote computing device, the information capable of identifying the thief;

at least one processor that executes the receiving module, the detecting module, the collecting module, and the reporting module.

14. The system of claim 13, wherein:

the detecting module determines that the attempt to log into the user account of the thief was successful by detecting the attempt to log into the user account of the thief via the stolen computing device;

the collecting module collects the information capable of identifying the thief by collecting login information entered by the thief as part of the attempt to log into the user account of the thief.

15. The system of claim 13, wherein:

the detecting module determines that the attempt to log into the user account of the thief was successful by detecting an attempt to access content associated with the user account of the thief;

the content associated with the user account of the thief comprises the information capable of identifying the thief.

16. The system of claim 13, wherein the detecting module determines that the attempt to log into the user account of the thief was successful by detecting an attempt to access content associated with the user account of the thief via a uniform resource locator associated with the user account of the thief, wherein the uniform resource locator associated with the user account of the thief comprises the information capable of identifying the thief.

17. The system of claim 13, wherein:

the detecting module determines that the attempt to log into the user account of the thief was successful by detecting an authentication token that was used to access the user account of the thief;

the collecting module collects the information capable of identifying the thief by using the authentication token to access content associated with the user account of the thief, wherein the content associated with the user account of the thief comprises the information capable of identifying the thief.

18. A non-transitory computer-readable medium comprising one or more computer-executable instructions that, when executed by at least one processor of a computing device, cause the computing device to:

receive an indication that the computing device has been stolen;

determine that an attempt by a thief of the stolen computing device to log into a user account of the thief via the stolen computing device was successful;

collect, at the stolen computing device based at least in part on determining that the attempt was successful, information capable of identifying the thief, wherein the information capable of identifying the thief is accessible at the stolen computing device only when the thief has successfully logged into the user account of the thief via the stolen computing device;

report, to a remote computing device, the information capable of identifying the thief.

* * * * *